No. 730,948. PATENTED JUNE 16, 1903.
A. MIDDLETON & T. S. PEARSON.
ATTACHMENT FOR MOWING MACHINES.
APPLICATION FILED JUNE 9, 1902.
NO MODEL. 2 SHEETS—SHEET 2.
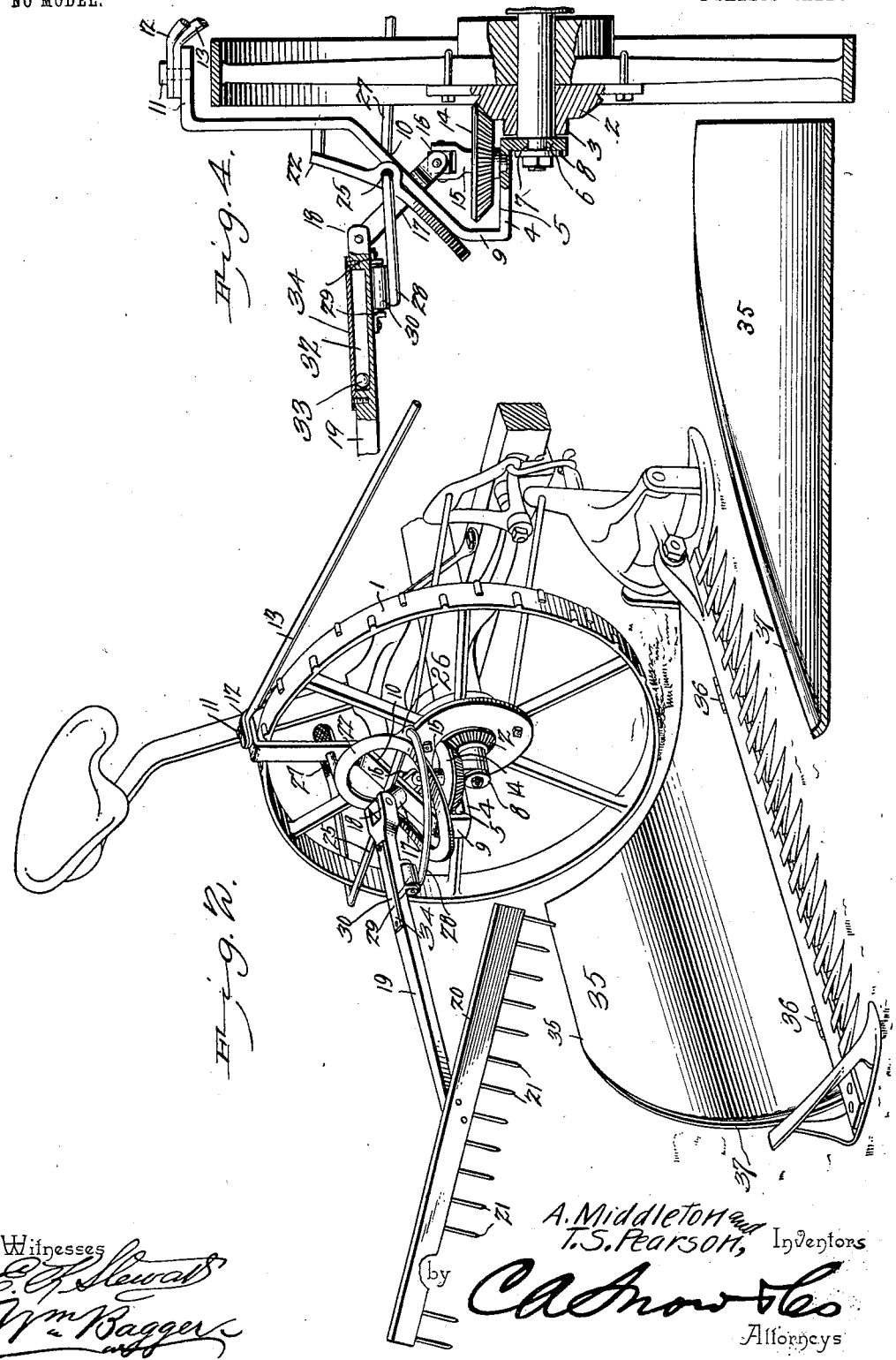

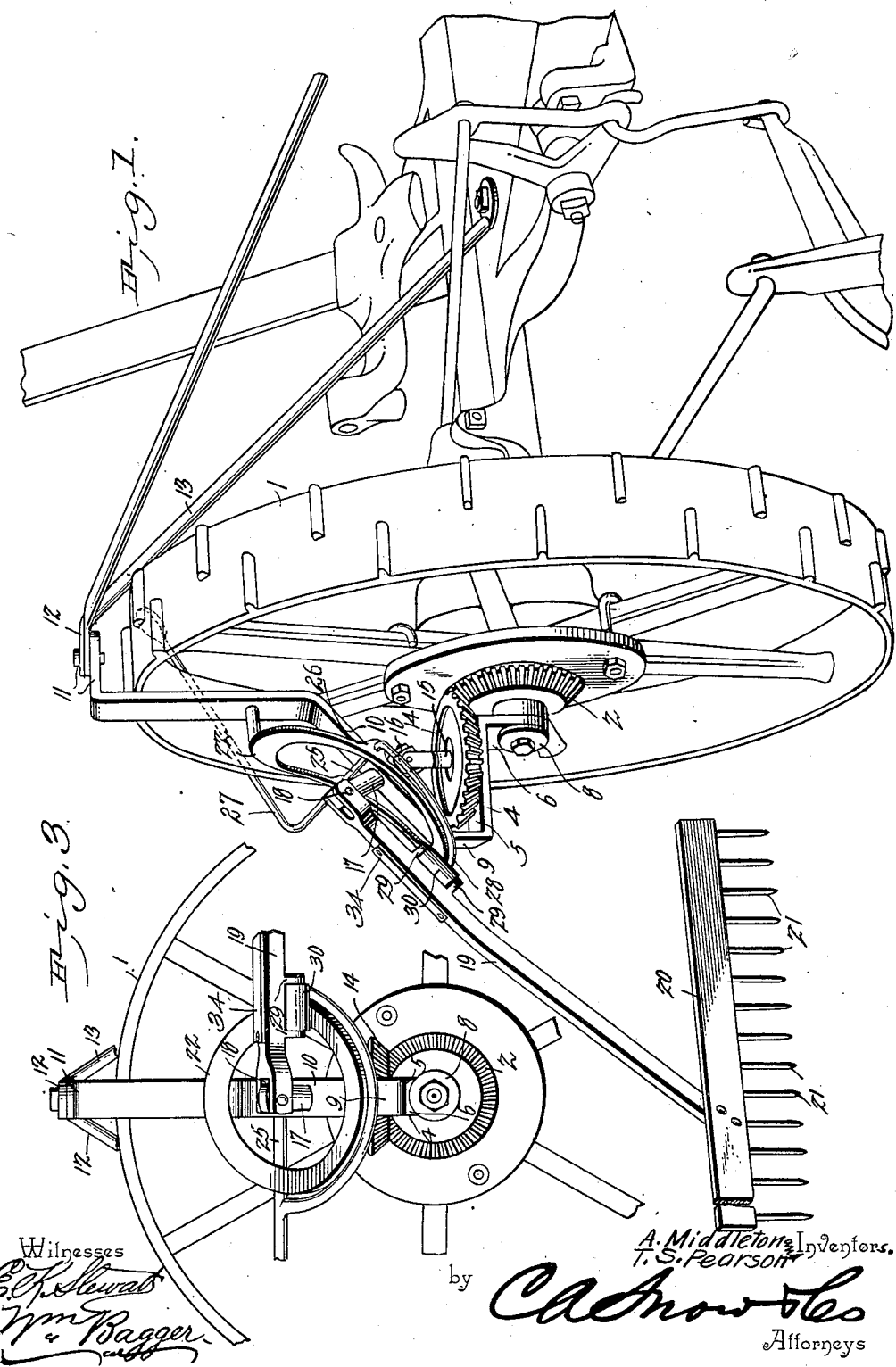

No. 730,948.

Patented June 16, 1903.

UNITED STATES PATENT OFFICE.

ABRAM MIDDLETON AND THOMAS S. PEARSON, OF KOKOMO, INDIANA, ASSIGNORS OF ONE-THIRD TO NELSON G. HANNA, OF KOKOMO, INDIANA.

ATTACHMENT FOR MOWING-MACHINES.

SPECIFICATION forming part of Letters Patent No. 730,948, dated June 16, 1903.

Application filed June 9, 1902. Serial No. 110,938. (No model.)

*To all whom it may concern:*

Be it known that we, ABRAM MIDDLETON and THOMAS S. PEARSON, citizens of the United States, residing at Kokomo, in the county of Howard and State of Indiana, have invented a new and useful Attachment for Mowing-Machines, of which the following is a specification.

This invention relates to an attachment for mowing-machines by which a revolving rake acting in conjunction with a horizontal platform placed immediately behind the sicklebar or cutting apparatus rakes and sweeps the grass which is cut by the machine in one bunch or heap to a position immediately in the rear of the mower and there deposits it.

The object of the invention is to provide a device of this class which shall not only obviate the necessity of raking the cut grass or other crops cut by the machine into windrows by a separate machine for the purpose of depositing such grass, &c., in such a position that it will not be run over or trampled upon by such mower and the horses attached to the same upon the next round, but which will deposit such grass, &c., in compact bunches or heaps, so that it may without further labor, be easily and swiftly gathered up and loaded upon wagons for hauling away.

A further object of the invention is to so construct the raking mechanism that whenever the crop is thin or light the rake shall pass over the material, resting upon the platform in an elevated position and without engaging the same, the said rake being in the meanwhile held and caused to traverse the platform in an elevated position, at which it is retained by mechanism to be hereinafter described and which forms the subject of our invention.

The invention further consists in an improved construction and arrangement of the detailed parts of the device, which will be hereinafter fully described, and particularly pointed out in the claims.

In the accompanying drawings, Figure 1 is a perspective view showing one end of a mowing-machine having our invention applied thereto in position for operation, the cutting apparatus and platform having been removed in order that the detailed parts of the invention may be seen more clearly. Fig. 2 is a similar view, but showing the cutting apparatus and platform in position and showing the rake-arm elevated so as to traverse the platform without engaging the same. Fig. 3 is a side elevation of the device as shown in Fig. 1. Fig. 4 is a vertical sectional view of the device as shown in Fig. 2 and looking toward the rear end of the machine.

Corresponding parts in the several figures are indicated by like characters of reference.

1 designates one of the supporting-wheels of a mowing-machine, upon which the bevel-gear 2 is clamped in the usual manner. The hub 3 of said bevel-gear supports the frame 4 of our improved attachment. Said frame may be described as consisting of a platform 5, having at its inner end a downwardly-extending bracket 6 with a perforation 7, which is journaled upon the hub 3, and where it is retained in position by means of a disk 8, secured upon the outer end of said hub. The platform 5 is provided at its outer end with an upwardly-extending bracket 9, from the upper end of which an arm 10 extends at a diagonal or upward incline in an inward direction, and provided at its upper terminal with means 11 for connection with the ends of braces 12 and 13, whereby the frame 4 is connected with the frame of the machine, so as to retain it constantly in an upright position. We desire it to be understood that the exact structure of this frame is capable of being considerably modified without departing from the spirit or limiting the scope of our invention, the only necessary qualifications being that it shall be suitably constructed to be supported by the rotary part of and to have rigid connection with the frame of the mowing-machine and that, furthermore, its general structure shall be such as to enable it to firmly support the operative parts of our invention.

The frame 4 supports upon the platform 5 thereof a bevel-wheel 14, which meshes with the bevel-gear 2 of the mowing-machine. The upper end of the shaft 15 of said bevel-gear 14 is connected by a knuckle-joint 16 with the lower end of a stem or shaft 17, journaled in the inclined portion 10 of the supporting-frame and the upper end of which is connected by a hinge-joint 18 with the inner end of the rake-arm 19. The latter carries at its outer end the rake 20, which is provided in the usual manner with teeth 21. The general construction of the rake may be varied to suit individual preferences.

Upon the upper side of the frame 4 and connected therewith in any suitable manner is arranged the rake-track 22, which, as shown, may consist of an approximately circular ring encircling the bearing of the stem or shaft 17, but set in an inclined position with relation to the latter, its upper portion being thrown in an upper and outward direction, as shown, so as to guide the rake-bar 19 when passing over it to an approximately vertical position, as will be readily understood. To assist in this, the ring which constitutes the rake-track may also be bent or concaved upon its upper side in a manner which will be clearly understood when reference is had to Fig. 4 of the drawings. Now we would have it to be understood that this rake-track may be cast or formed as an integral part of the frame 4, or it may be made separately and of a different material, such as wrought-iron, and connected therewith in any suitable manner, also that when thus connected braces or supports may be interposed when necessary in order to sustain it in any desired position with relation to the said frame, also that such braces or supports may be made to constitute integral parts either of the rake-track or of the frame, also that the said rake-track may be constructed in the form of a ring or of a solid disk, all without changing the scope or departing from the spirit of our invention.

The rake-track is provided with bearings for a transverse shaft 25. These bearings may be formed in ears or lugs 26, depending from opposite sides of the said rake-track or in any other suitable manner. The shaft 25, which extends in a rearward direction, is provided at its rear end with a crank 27, forming a treadle which may be easily reached by the foot of the driver of the machine, who may thereby tilt the said shaft in its bearings. An independent foot-piece may be arranged upon the crank or treadle 27; but this is not essential. The front end of the shaft 25 is curved in a rearward direction to the approximate form of a semicircle 28, which normally lies in contact with the outer or lower edge of the rake-track 22, forming an auxiliary track, the purpose of which will be presently made apparent. The portion 28, which constitutes this auxiliary track, is not necessarily an integral portion of the shaft 25. It may be separately constructed and attached to the shaft in any suitable manner; but the form described and herein shown, while believed to be thoroughly efficient for the purposes intended, is probably the simplest and least expensive. The free end of the semicircular portion, which forms the auxiliary track 28, when constructed integrally with the said shaft may be connected with the latter by twisting it around or otherwise making it fast to the said shaft.

The rake-bar 19 supports on its under side in brackets 29, forming suitable bearings, a roller 30, which rides upon the track, so as to relieve the rake-bar from unnecessary friction, which would result from direct contact with the said track.

We prefer to form in the upper side of the rake-bar 19 a longitudinal recess or mortise 32, in which is placed a ball or weight 33, the same being inclosed in the said mortise by a cover 34. This ball or weight will tend to assist in causing the rake-bar to move past a vertical position as it approaches the upper limit of its movement in a rearward direction. This feature may or may not be used in connection with our invention, at the option of the manufacturer of the same.

35 designates the platform which is to be connected with the rear side of the sickle-bar of the machine, preferably by means of hinges 36 or other suitable connecting means which will permit the said platform to ride over obstructions by yielding thereto in an upward direction. The said platform will thus adapt itself to small or abrupt inequalities of the ground. As regards the construction of said platform it is preferred that it should be slightly curved, so as to conform to the sweep of the rake in passing over it, and at its outer edge it is provided with a slightly-upturned flange or "roll" 37, which will serve to prevent the cut grass from dribbling off the platform.

The operation of the invention and its advantages will be readily understood from the foregoing description, taken in connection with the drawings hereto annexed. When the mowing-machine to which our invention has been applied is drawn over the field, the grass cut thereby will lodge upon the platform 35 and there be retained during one full revolution of the rake-arm imparted thereto by the intermediate connecting mechanism which has been herein described. When the rake reaches the forward and downward limit of its movement, it engages the forward end of the curved platform 35 and in its passage over the same rakes off the grass, &c., deposited thereon, throwing the same off at the rear end of the platform.

When the crop is very light or very thin, it may be desirable to permit the rake to accomplish one or more revolutions without raking the grass, &c., off the platform, but rather permitting the same to accumulate until a sufficient bunch has been gathered. Whenever this is the case, it is only necessary for the driver of the machine to depress the crank or treadle 27 of the shaft 25, thus tilting the latter in its bearings and elevating the auxiliary track 28. The latter will thus be engaged by the contact-roller upon the under side of the rake-bar, and the latter will accomplish its circuit in an elevated position from the platform and without engaging or interfering with the material deposited thereon. When a sufficient quantity has been gathered or accumulated upon the platform, the driver simply releases his pressure upon the crank or treadle 27, thus causing the auxiliary track to drop to its normal position. Should it not drop automatically by its own weight, the weight of the rake will be sufficient to force it back to its normal position.

We desire it to be distinctly understood that while we have herein described and illustrated the preferred form of our invention we do not regard ourselves as limited as to the details thereof, but consider ourselves entitled to any changes and modifications in the structure of the detailed parts which may be resorted to without departing from the spirit of our invention. Thus, for instance, chain-gearing might be substituted for the cog-gearing herein described for transmitting motion from the supporting-wheel of the mower to the operative parts of our device by simply making changes in the structure, which would readily suggest themselves to any mechanic.

Having thus described our invention, we claim and desire to secure by Letters Patent of the United States—

1. In a mowing-machine, the combination of a transporting-wheel, a bevel-wheel clamped thereon, a frame journaled upon the hub of said bevel-wheel and having rigid connection with the machine-frame, rake mechanism supported upon the frame journaled upon the hub of the bevel-gear and means for transmitting motion from the latter to said rake mechanism.

2. In a mowing-machine, the combination of a main frame, a supporting-frame having rigid connection with said main frame and having a bearing in which one of the revolving members of said mowing-machine is supported, a shaft journaled in said supporting-frame, a rake hinged at the outer end of said shaft, a track for said rake supported upon the frame, a bevel-gear mounted upon the frame, a knuckle-joint connecting the shaft of said bevel-gear with the inner end of the shaft carrying the hinged rake, and means for operating said bevel-gear.

3. The combination of a bevel-wheel clamped upon one of the wheels of a mowing-machine, a frame journaled upon the hub of said bevel-wheel, a pinion supported upon said frame and meshing with said bevel-wheel, a shaft journaled in the frame and carrying a hinged rake at its outer end, a knuckle-joint connecting the inner end of said shaft with the shaft of the pinion, and a rake-track supported upon the frame, substantially as set forth.

4. In a device of the class described, the combination with the rake-track having depending ears, of a shaft journaled in said ears, extended rearwardly and provided with a treadle, and an auxiliary track connected with said shaft and lying normally in contact with the lower edge of the main track, substantially as set forth.

5. In a device of the class described, the combination of a main frame, a revoluble member having a hub, a supporting-frame rigidly connected with said main frame and having a bearing journaled upon the hub of the aforesaid revoluble member, a rake-track supported upon said frame, a rock-shaft journaled transversely to the latter and carrying an auxiliary track, means for operating the latter, a pinion mounted within the supporting-frame and meshing with the bevel-gear which constitutes the revoluble member upon the hub of which said frame is journaled, a shaft mounted axially in the rake-track, a hinged rake-bar at the outer end of said shaft, and a knuckle-joint between said shaft and the shaft of the pinion.

6. In a device of the class described, the combination of a shaft, a rake hinged thereto, a track encircling the rake-carrying shaft, a longitudinal mortise in the rake-bar, a weight arranged slidingly in said mortise, means for retaining said weight in said mortise, and suitable operating mechanism, substantially as set forth.

In testimony that we claim the foregoing as our own we have hereto affixed our signatures in the presence of two witnesses.

ABRAM MIDDLETON.
THOMAS S. PEARSON.

Witnesses:
J. W. COOPER,
L. E. COLLIER.